Feb. 12, 1924.
W. H. THIEMER
UNIVERSAL JOINT
Filed Nov. 17, 1922
1,483,560
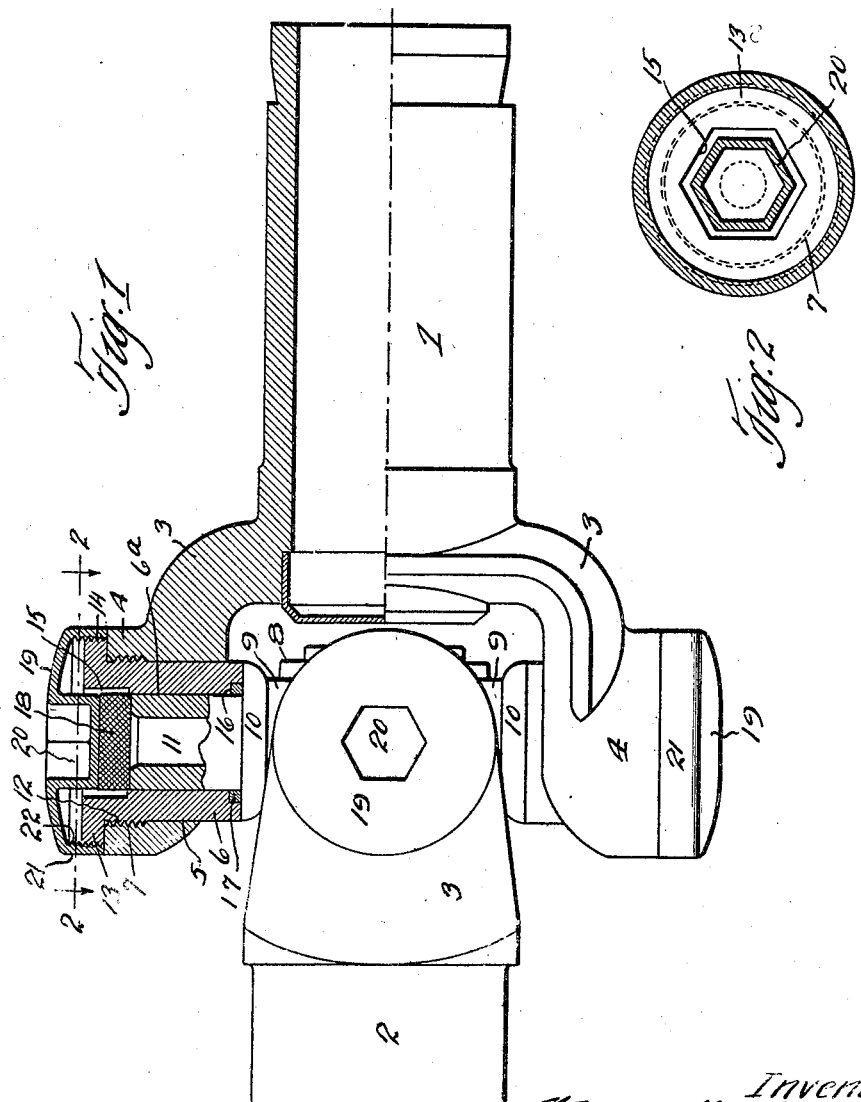
Inventor
William H. Thiemer
By Hull, Buck & West
Attys.

Patented Feb. 12, 1924.

1,483,560

UNITED STATES PATENT OFFICE.

WILLIAM H. THIEMER, OF CLEVELAND, OHIO, ASSIGNOR TO FREDERICK W. PETERS, J. H. WILLS, AND HIMSELF, ALL OF CLEVELAND, OHIO.

UNIVERSAL JOINT.

Application filed November 17, 1922. Serial No. 601,459.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to the means for assembling the yoke arms upon the trunnions of the cross members. A further object of the invention is to construct a joint of this character with novel means for distributing lubricant from the central cross member to the trunnion bearings. Further and more limited objects of the invention will appear hereinafter and will be realized in and through the construction and arrangement of parts embodied in the claims hereto annexed.

In the drawings forming a part hereof, Fig. 1 represents a sectional side elevation of a joint constructed in accordance with my invention; and Fig. 2 a sectional view corresponding to the line 2—2 of Fig. 1.

Describing by reference characters the various parts illustrated herein, 1 and 2 denote a pair of hubs adapted to be applied to the opposed ends of shaft sections (not shown), each hub carrying a yoke comprising a pair of arms 3, each arm having formed therewith a bearing block 4.

Each hub is shown as formed integrally with its yoke arms, and the bearing blocks for each yoke are provided each with a bore 5 for a bearing bushing 6.

The arms 3 project nearly parallel in the direction of the hub and are symmetrical, whereby the bores 5 may be formed by linereaming both arms. That is to say, the journal holes in the arms may be bored by a single continuous operation of a single reamer, or by a double reamer on a single arbor, using a suitable pilot or pilots. This manner of line-reaming insures that the axes of the bearing bores 5 will be in a true line, securing accuracy of fit for the trunnion bushings and preventing lateral thrust of such trunnions against the ends of the bores. After the bearing blocks have been thus reamed, the bores will be threaded in their exterior portions, as indicated at 7.

The cross is shown as made of one piece and is of the lubricating type, having a central receptacle or well 8 from which there project cross arms 9, each having an inwardly rounded shoulder 10 and a relatively reduced hollow trunnion 11. Each trunnion is mounted within a bearing bushing 6, each bushing having a threaded portion 12 cooperating with the thread 7 in its bearing block and being provided at its outer end with a flange 13 adapted to engage with its inner face the outer face of said bearing block. Each flange is provided with an external thread 14.

The main bore 6ª of each bushing preferably is extended slightly beyond the outer end of its cooperating trunnion 11 and is there formed into a hexagonal recess 15, said recess extending to the outer end of the bushing and constituting a well for lubricant that may pass the pad (to be described hereinafter) as well as a socket for the reception of a wrench or similar tool. The inner end of each bushing is provided with an annular recess 16 at its inner face, the said recess being adapted to receive a ring 17 of felt, or similar absorbent material, the said ring serving to prevent leakage of lubricant between the inner end of the bushing and the outer face of the cooperating shoulder 10. The length of the cylindrical portion 6 of each bushing is such that, when the flange 13 is screwed home upon the outer face of its bearing block 4, there will be a slight clearance between the inner end of said bushing and its cooperating shoulder 10, this clearance enabling the ring 17 to be compressed against said shoulder through the adjustment of the bushing and thus enabling a leak-proof joint to be formed by the ring between each trunnion and bushing.

Within the outer end of the cylindrical bore 6ª and bearing against the outer end of the bushing 11 is a pad 18 of felt, or similar absorbent material. This pad is retained in place and the outer end of each arm-and-bushing assembly is closed by means of a cap 19 having an inwardly extending hexagonal portion 20 adapted to be received within a recess 15 and to bear at its inner end against the pad 18. Each cap is provided with an annular flange 21 having a thread 22 adapted to be applied to the thread 14. The annular recess formed by the inward projection 20 constitutes a socket for the reception of a wrench or similar tool.

In order to secure the proper locking of the bushing and cap, the threads 7 and 12 are reversely arranged with respect to the threads 14 and 22. In practice, the former threads are right-hand threads and the latter are left-hand threads. By this arrangement, each bushing 6 will be locked in place by its cap and will also serve to lock its cap in place; any unscrewing movement of either the bushing or its cap will result in a tendency to tighten the other member or part.

The joint as a whole is capable of economical production, but is markedly efficient in securing efficient lubrication of the parts and is capable of rapid and convenient assembling and disassembling. Furthermore, the manner of forming and connecting the bushings and caps enables the latter to perform their functions with no unnecessary extension thereof beyond the bearing blocks.

Having thus described my invention, what I claim is:

1. In a universal joint, the combination of a bearing block having a bore therethrough provided with a thread within its outer portion, a cross member having a trunnion adapted to be received within said bore, said trunnion being provided with a shoulder, a bushing having a flange adapted to rest upon the outer end of the bearing block and having a threaded portion adjacent to said flange and adapted to engage the threaded portion of said bore, said bushing adapted to surround said trunnion and there being packing interposed between the inner end of the said trunnion and the said shoulder, the peripheral portion of said flange being threaded reversely from the other portion of said bushing, and a cap having a flange provided with a thread adapted to mesh with the last-mentioned thread.

2. In a universal joint, the combination of a bearing block having a threaded bore, a cross member having a trunnion adapted to be received within said bore, a bushing having a flange adapted to rest upon the outer end of the bearing block and having a thread adapted to engage the threaded portion of said bore, said bushing adapted to surround said trunnion and the peripheral portion of said flange being threaded reversely from the other portion thereof, and a cap having a thread adapted to mesh with the last mentioned thread.

3. In a universal joint, the combination of a bearing block having a bore therethrough provided with a thread within its outer portion, a cross member having a trunnion adapted to be received within said bore, said trunnion being provided with a shoulder, a bushing having a flange adapted to rest upon the outer end of the bearing block and having a threaded portion adjacent to said flange adapted to engage the threaded portion of said bore, said bushing adapted to surround said trunnion and there being packing interposed between the inner end of the said trunnion and the said shoulder, the peripheral portion of said flange being threaded reversely from the other portion of said bushing, a cap having a flange provided with a thread adapted to mesh with the thread on said bushing flange, said cap being provided with a central inwardly projecting portion, and a pad extending across the outer end of said trunnion and adapted to be engaged by such projecting portion of said cap, the cross member being provided with a lubricant well and the trunnion having a central bore communicating with such well.

4. In a universal joint, the combination of a bearing block having a bore therethrough provided with a thread within its outer portion, a cross member having a trunnion adapted to be received within said bore, said trunnion being provided with a shoulder, a bushing having a flange adapted to rest upon the outer end of the bearing block and having a threaded portion adjacent to said flange and adapted to engage the threaded portion of said bore, said bushing adapted to surround said trunnion and there being packing interposed between the inner end of the said trunnion and the said shoulder, a cap having a flange provided with a thread adapted to mesh with the thread on said bushing flange, said cap being provided with a central inwardly projecting portion, and a pad extending across the outer end of said trunnion and adapted to be engaged by such projecting portion of said cap, the cross member being provided with a lubricant well and the trunnion having a central portion communicating with such well.

5. In a universal joint, the combination of a bearing block having a bore therethrough, the outer end portion of said bore being threaded, a cross member having a lubricant well provided with a trunnion having a bore communicating with said well and adapted to be received within the said bore, a bushing adapted to receive said trunnion therewithin and having a threaded portion by which it is secured within said bore, the said bushing extending beyond the end of the said trunnion and forming a well therewith, a pad within said well adapted to engage the outer end of the trunnion, and a cap adjustably mounted upon the said bushing and having an inwardly projecting portion adapted to force the said pad against the outer end of said trunnion.

6. In a universal joint, the combination of a bearing block having a bore therethrough, the outer end of said bore being threaded a cross member having a central lubricant well and a trunnion provided with a bore communicating with said well, the said trunnion being adapted to be received within said bore, a bushing having an external threaded portion arranged to cooperate with the threaded portion of said bore and having its inner surface fitting about said trunnion, there being a well provided beyond the outer end of said trunnion, and a cap for closing said well, the said cap being threaded on the bushing and the threads by which the cap and bushing are connected being reversely arranged with respect to the threads by which the bushing and the bearing block are connected.

7. In a universal joint, the combination of a bearing block having a bore therethrough, the outer end of said bore being threaded, a cross member having a central lubricant well and a trunnion provided with a bore communicating with said well, the said trunnion being adapted to be received within said bore, a bushing having an external threaded portion arranged to cooperate with the threaded portion of said bore and having its inner surface fitting about said trunnion, there being a well provided within said bushing beyond the outer end of said trunnion, a cap for closing said well, the said cap being threaded on the bushing and the threads by which the cap and bushing are connected being reversely arranged with respect to the threads by which the bushing and the bearing block are connected, and a pad on the outer end of said trunnion, the cap having a portion adapted to engage said pad and to compress the same upon such trunnion end.

8. In a universal joint, the combination of a bearing block having a bore provided with a thread in its outer portion, a cross member having a trunnion adapted to be received within said bore, a bushing adapted to surround and to receive said trunnion and having a threaded portion cooperating with the threaded portion of said bore and a flange adapted to rest upon the outer face of said block, the peripheral face of said flange being threaded and the said bushing having beyond the end of the trunnion, an angular well, a cap having a central inwardly projecting angular socket adapted to be received within said well and having a peripheral flange provided with an internal thread to cooperate with the peripheral thread on the bushing flange, the threads on said flanges being reversely arranged with respect to the threads on the bearing block and bushing bore, and a pad of absorbent material extending across the outer end of said trunnion and adapted to be engaged by the socket projection of said cap, the said cross member having a central lubricant well and the trunnion a bore communicating with such well.

9. In a universal joint, the combination of a bearing block having a bore provided with a thread, a bushing having a thread cooperating with said bore, a cross member having a central well and a trunnion provided with a bore communicating with said well, the bushing being adapted to receive the trunnion directly therewithin and being provided with an angular well beyond such bushing, and a cap for closing said well and threaded upon the outer portion of said bushing, the said cap having an angular socket projecting thereinto, and a packing of absorbent material interposed between such socket projection and the outer end of the trunnion.

10. In a universal joint, the combination of a bearing block having a bore provided with a thread in its outer portion, a cross member having a trunnion adapted to be received within said bore, a bushing adapted to surround and to receive said trunnion and having a threaded portion cooperating with the threaded portion of said bore and a flange adapted to rest upon the outer face of said block, the peripheral face of said flange being threaded and the said bushing having a well therein beyond the end of the trunnion, a cap having a central inwardly projecting angular socket adapted to be received within said well and having a peripheral flange provided with an internal thread to cooperate with the peripheral thread on the bushing flange, and a pad of absorbent material extending across the outer end of said trunnion and adapted to be engaged by the socket projection of said cap, the said cross member having a central lubricant well and the trunnion a bore communicating with such well.

11. In a universal joint, the combination of a bearing block having a bore provided with a thread, a bushing having a thread cooperating with said bore, a cross member having a central well and a trunnion provided with a bore communicating with said well, the bushing being adapted to receive the trunnion directly therewithin and being provided with an angular well beyond such bushing, and a cap for closing said well and threaded upon the outer portion of said bushing, the said cap having a portion adapted to project into said well, and a packing of absorbent material interposed between such projecting portion and the outer end of the trunnion.

In testimony whereof, I hereunto affix my signature.

WILLIAM H. THIEMER.